Figure 1:
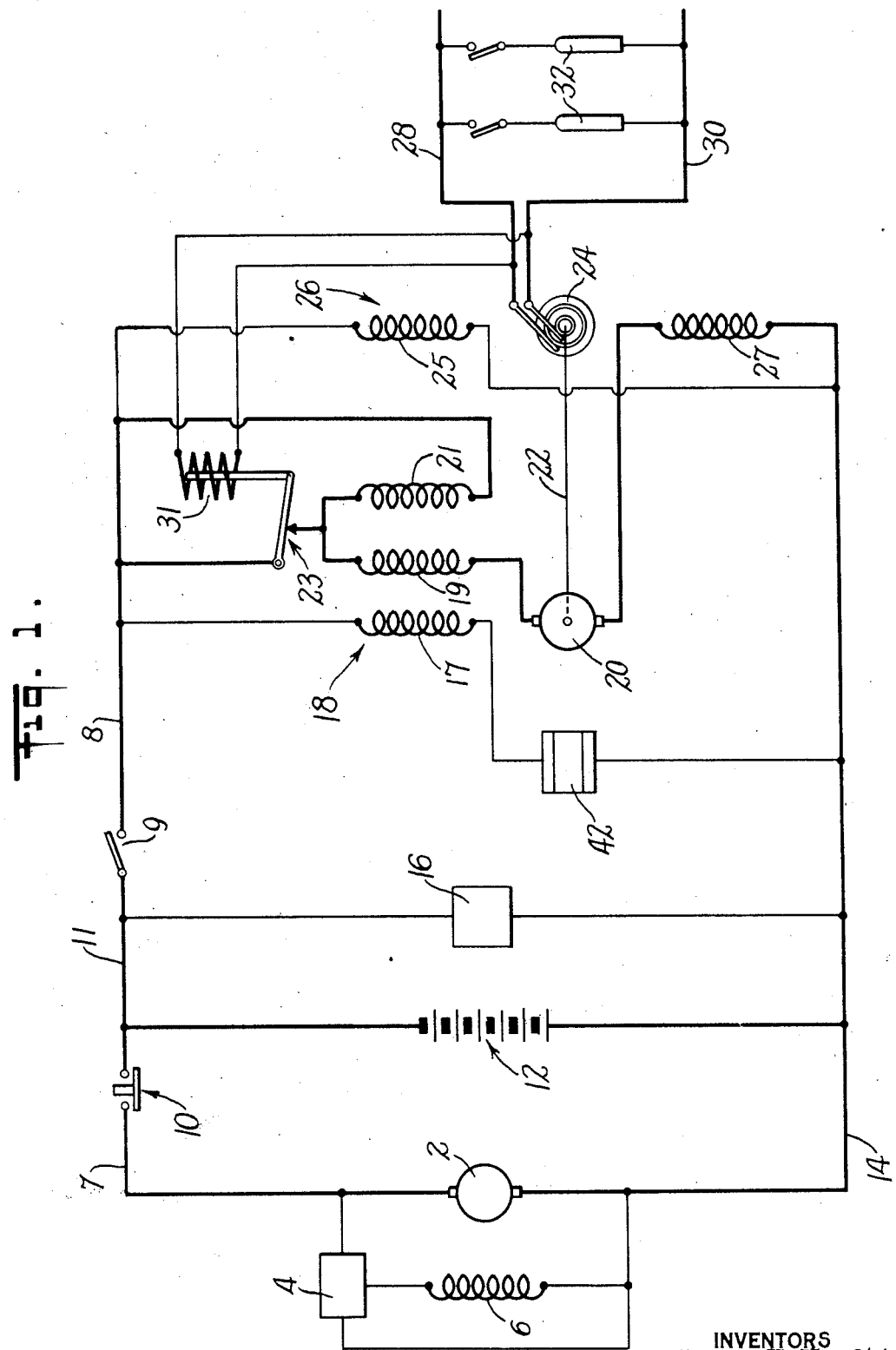

INVENTORS
Louis H. Von Ohlsen
John J. Kennedy
BY Blair, Curtis & Hayward
ATTORNEYS Patented Feb. 23, 1943

2,312,275

UNITED STATES PATENT OFFICE 2,312,275

ELECTRICAL SYSTEM

Louis H. Von Ohlsen and John J. Kennedy, New Haven, Conn., assignors to The Safety Car Heating and Lighting Company, Inc., a corporation of Delaware Application July 12, 1940, Serial No. 345,118

10 Claims. (Cl. 171—123)

This invention relates to the translation of power from one form to another, and more particularly to a system of supplying alternating current to fluorescent lights on railway cars.

An object of this invention is to provide a reliable and dependable source of alternating current of constant frequency and voltage. A further object is to provide a control for a motor alternator which is capable of receiving from a direct current source, the voltage of which varies over a wide range, and delivering to a load alternating current of constant frequency and voltage. A further object is to provide a source of supply for alternating current power which does not consume power when not in use but which may be conditioned for use in a minimum period of time.

A still further object is to provide control means for apparatus of the character referred to above which is automatically operable in response to changes in the source of supply and in the load to maintain the output voltage and frequency within permissible limits. Another object is to provide apparatus of the above character which is readily adaptable for use with different types of loads. A further object is to provide apparatus which is simple and sturdy in construction and which is inexpensive to manufacture and efficient in operation. A further object is to provide durable apparatus which is light in weight and dependable in operation. Other objects will be in part obvious and in part pointed out hereinafter.

The invention accordingly consists in the features of construction, combinations of elements, and arrangements of parts as will be exemplified in the structure to be hereinafter described and the scope of the application of which will be indicated in the following claims.

Figure 2:
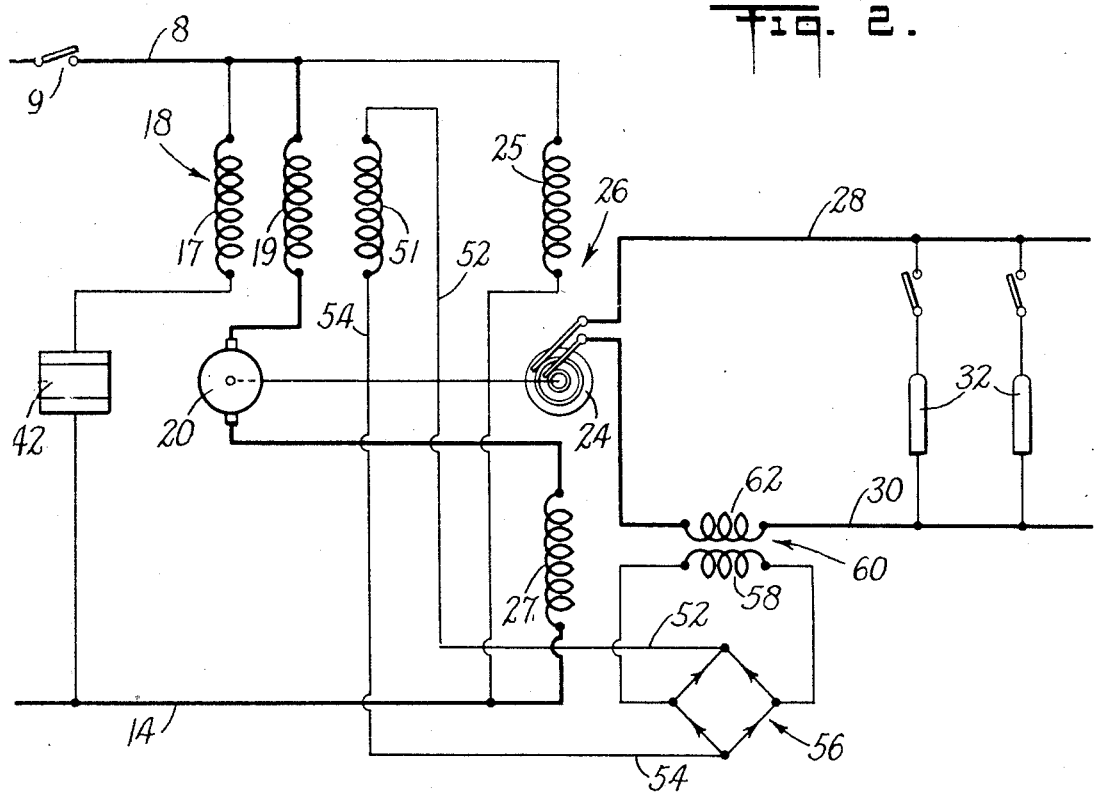
Figure 3:
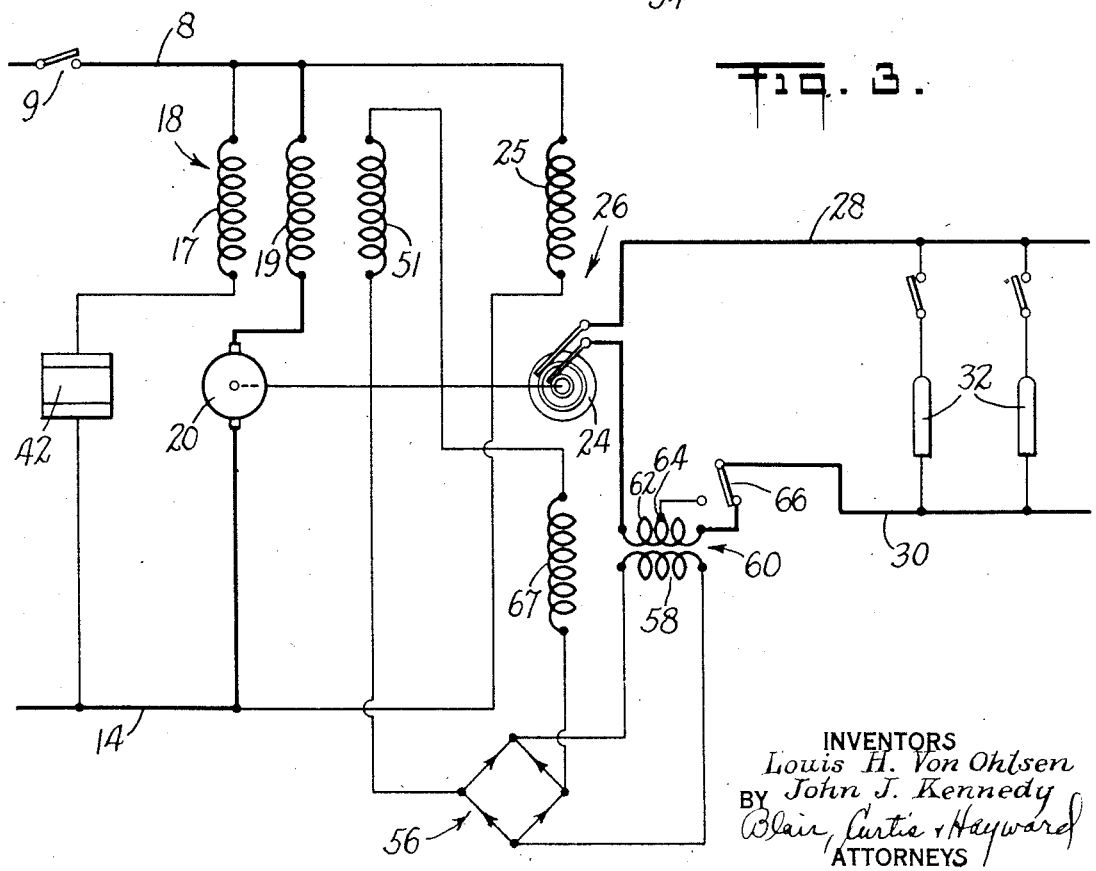

In the drawings:

Figure 1 is a circuit diagram of one embodiment of the invention with certain details omitted for clarity; and Figures 2 and 3 are similar to Figure 1, showing other embodiments of the invention.

All three of the illustrative embodiments of the invention are particularly suited for use on a railway car having an axle-driven generator, though the principles involved have application elsewhere. On railway cars, such as coaches, pullman cars, and the like, each car is provided with its own individual electrical system; this system generally includes a set of storage batteries, lighting and other equipment and an axle-driven generator to supply power for the equipment and for charging the batteries. Additional equipment is provided under some circumstances for supplying power to the system when the car is stationary in the yard, and in some systems, means is provided for driving air-conditioning equipment directly from the axle when the car is traveling at a proper speed. In all systems, the equipment should be sturdy and it should be dependable in action. Furthermore, it is difficult to insure that the equipment will receive proper attention during use, and it is therefore desirable that the equipment operate with a minimum of adjustment and repair. In addition to these considerations, it must be borne in mind that the equipment must be light in weight and efficient in operation.

It has been found that fluorescent lights are very well suited for railway lighting, and it is therefore desirable to provide for their use by furnishing a reliable and efficient source of alternating current on railway cars. It is not practical to provide only an axle-driven alternator as this would not operate when the car was stationary or moving at a slow speed, and the frequency would vary over a wide range. It is proposed to provide an alternator driven by a direct current motor deriving its power from the battery-generator system of the car. However, this is difficult because of many problems such as those referred to above. Further, it should be noted that during operation, the voltage of the car battery-generator system varies depending upon the condition of charge of the battery, and upon whether or not current is being supplied by the generator which is mechanically connected to the car axle. With the usual type of car system, the normal voltage variation may be from 28 to 45 volts. It is an object of this invention to provide a source of alternating current having the proper characteristics under the above conditions.

In the present embodiment of my invention, apparatus is provided which derives its power from the battery-generator system of the car and which produces alternating current of substantially constant frequency and voltage. The present invention is capable of receiving power over the wide range of voltage of the battery-generator system, and efficiently delivers alternating current of substantially constant voltage and frequency. During operation, there are changes in the alternating current load, and the present apparatus is capable of maintaining reasonably constant voltage and frequency with changes in the load.

In the embodiments of the invention herein disclosed, a motor alternator set is provided wherein an alternator is driven by a direct current motor which starts rapidly because of the use of a starting winding, but when the set comes up to speed, the starting winding is rendered ineffective so that it does not interfere with the proper operation of the set. Certain features of the present invention render the apparatus adaptable for standardization so that one unit may be readily installed for use in any one of several different types of cars.

Referring particularly to the left-hand side of Figure 1 of the drawings, a generator 2 is provided with a controller 4 which maintains the proper current in the generator field 6. One side of the generator is connected through a line 7 and a switch 10 to a line 11 and a set of batteries 12; this line 11 is connected through a manual switch 9 to a line 8. The other side of the generator is connected through a line 14 to the other side of the batteries. Lines 11 and 14 are the main power lines of the battery-generator system which carries a load 16 consuming direct current. When switch 9 is closed, the voltage across lines 8 and 14 is the same as that of lines 11 and 14, and this voltage varies depending upon the state of charge of the set of batteries and the starting and stopping of the charging action of the generator. Connected across lines 8 and 14, and thus adapted to be energized by the voltage of the battery-generator system, is a direct current motor 18 having a main shunt field winding 17, a starting winding 19 for producing high starting torque and an armature 20. Armature 20 is connected through a shaft 22 to drive the armature 24 of an alternator indicated at 26 and having a main field winding 25 and an auxiliary field winding 27. The alternator output brushes are connected to a pair of alternating current lines 28 and 30 which supply alternating current to a load 32 which, in this embodiment, is a bank of fluorescent lights and their attendant auxiliaries.

Motor 18 operates at constant speed throughout a wide range of variation in the supply voltage, and illustratively, this motor is of the type shown in United States Patent No. 2,134,900. Accordingly, the main field winding 17 is connected in series with a resistance unit 42 of Thyrite, or any other material having similar voltage and current characteristics. The magnetic section of the motor 18 is liberal in design and operates below the saturation point on the magnetization curve of the iron. Thus, an increase in field current is accompanied by a substantially proportionate increase in magnetic flux.

Resistance unit 42 has the characteristic that its conductivity varies with the potential impressed upon it and when there is a variation in the voltage impressed upon the field circuit, the field current varies at a rate more rapid than does the voltage. Due to the unsaturated condition of the iron, the current variation is accompanied by a substantially proportionate variation in flux. Illustratively, if the voltage across lines 8 and 14 increases, there is a substantially greater increase in the field current and in the magnetic flux. This substantial increase in magnetic flux is sufficient to hold the motor speed constant.

As explained in detail in the above-mentioned patent, resistance unit 42 has a negative resistance-temperature coefficient, and it is so designed and positioned that the changes in its resistance compensate for the changes in resistance of field winding 17. Thus, the conditions of use do not cause changes in field current which would result in appreciable changes in motor speed because of temperature changes.

It is important that upon the closing of switch 9 power will be available for the bank of lights 32 without undue delay, and motor 18 is therefore provided with a starting winding 19 so designed as to make the motor start rapidly. Starting winding 19 produces magnetic flux in the same direction as the magnetic flux of the main field winding 17, with the starting winding producing the main portion of the field flux during the starting period and with the main field winding producing the effective portion of the field flux when the motor is brought up to full speed.

When the motor is running at full speed, the motor armature current which flows through winding 19 varies with the load and due to the unsaturated condition of the iron parts of the motor, these variations in current tend to cause variations in the field flux. This is undesirable, particularly because of the fact that variations in field flux have an inverse effect upon motor speed. That is, an increase in load tends to cause an increase in this field flux which in turn tends to cause a decrease in motor speed, and a decrease in load tends to cause a decrease in this flux which in turn tends to cause an increase in motor speed. In addition to this effect of winding 19, the mechanical load upon the motor tends to slow it down due to factors such as armature reaction.

To compensate for these effects, motor 18 is provided with a compensating field winding 21 which opposes the main motor field winding 17 and starting winding 19. This compensating field winding is so proportioned that as the load on the motor increases, the total field flux produced by all of the motor fields is reduced so that the motor speed remains constant. However, winding 21 is not energized during the starting period, and therefore does not interfere with the starting function of winding 19. In this embodiment, compensating winding 21 is rendered ineffective during the starting period by the closing of a normally closed switch 23 which connects the juncture of windings 19 and 21 with line 8. After the motor-alternator set comes up to full speed, switch 23 is opened by the energization of its solenoid 31 which is connected across lines 28 and 30 of alternator 26.

Accordingly, during the starting period, switch 23 is closed with the result that the current flowing to winding 19 flows through switch 23 and winding 21 is short-circuited so that it carries no current and is ineffective. Later, when the motor alternator comes up to speed, solenoid 31 is energized to thereby open switch 23, and the motor armature current then flows through winding 21. This renders winding 21 effective to neutralize the effect of winding 19 and the effect of armature reaction, and the effective magnetic field of the motor is thereby maintained at the proper value to hold the motor speed constant.

As indicated above, the magnetic field of alternator 26 is produced by the main alternator field winding 25, which is connected across lines 8 and 14, and the auxiliary alternator field winding 27. The iron core of alternator 26 is such that the flux produced by alternator field winding 25 is substantially constant even though the voltage between lines 8 and 14 varies over a wide range. In this manner, the flux produced by main field winding 25 tends to produce a constant voltage across the output lines 28 and 30.

However, the load of the bank of lights and auxiliaries varies over a wide range so that the output current of alternator 26 varies; and the alternator voltage varies due to the armature reaction. Thus, an increase in load current tends to cause a drop in line voltage, and it is desirable to compensate for this voltage drop by increasing the excitation of the alternator. Accordingly, auxiliary field winding 27 carries the motor armature current, which current varies with the load upon alternator 26. Thus, as the alternator current load is increased, there is a corresponding increase in the mechanical load upon motor 18 and a resultant increase in armature current. This produces an increase in the flux of auxiliary field winding 27 which adds to the flux produced by main field winding 25. In this manner, the increase in current load on the alternator is accompanied by an increase in the excitation of the alternator, which increase is sufficient to compensate for the armature reaction. As a result, the voltage of the alternator remains constant.

In the similar embodiment of Figure 2, the tendency for changes in load to cause changes in motor speed is neutralized by the use of current derived from the alternator 26. As explained in the discussion of the embodiment of Figure 1, changes in load tend to cause changes in motor speed due to the effect of starting winding 19 and the effect of armature reaction, etc. In Figure 2, these effects are compensated for by a compensating winding 51 which is connected through leads 52 and 54 to a rectifier unit 56. Rectifier unit 56 receives power from the output winding 58 of a current transformer 60 having its primary winding 62 in line 30 of the alternator load circuit. During the starting period of the motor alternator, and until there is a load on the alternator, there is no current flowing through line 30, and therefore no current is supplied to winding 51, with the result that starting winding 19 and the main field winding 17 produce the entire field flux. When there is a load on alternator 26, a proportionate current is delivered through transformer 60 and rectifier unit 56 to winding 51 and this current tends to oppose the effect of field windings 19 and 17. The effect of this current in winding 52 is sufficient to neutralize winding 19, and other factors, such as armature reactance, etc., which tend to reduce the motor speed. Thus, as in the embodiment of Figure 1, the compensating field winding reduces the total field flux produced by all of the motor field windings to maintain constant motor speed.

Referring to the embodiment of Figure 3, the effect of changes in load upon the motor speed is neutralized in the same manner as the embodiment of Figure 2 with the compensating field winding 51 receiving current through rectifier unit 56 and current transformer 60. However, in Figure 3, the current from rectifier unit 56 is also utilized to compensate the alternator voltage for changes in the load so that the flux produced by the auxiliary winding depends directly upon the alternator current rather than upon the motor armature current as in the embodiments of Figures 1 and 2. Accordingly, the auxiliary field winding 67 of the alternator is connected in series with compensating winding 51.

When the load current is used to produce the load-compensating flux for the alternator and the compensating effect for the starting winding, it is desirable that the equipment be adjustable to permit its use with loads of different power factors, as a change in the power factor of the load changes the compensation. To allow for this, the primary winding 62 of transformer 60 is provided with a tap 64 which is connected to line 30 when the blade of a switch 66 is at the left. When the blade of switch 66 is at the right as shown, the current of line 30 flows through the entire winding 62, and when the blade is at the left, the current of line 30 flows through only a portion of winding 62.

Thus, when the power factor of the load is 100 per cent, the blade of switch 66 is moved to the right and the compensations of winding 51 and of auxiliary winding 61 are such as to maintain proper motor speed compensation and proper alternator voltage compensation. When the power factor of the load is low, as for example at 60 per cent, the blade of switch 66 is moved to the left, thus cutting out a portion of the primary winding 62 and changing the value of the current supplied to windings 51 and 67. It is understood that tap 64 may be located on winding 62 to compensate for any power factor, and when desirable, more than one tap may be provided with a contact on switch connected to each tap.

As many possible embodiments may be made of the above invention and as many changes might be made in the embodiment above set forth, it is to be understood that all matter hereinbefore set forth, or shown in the accompanying drawings is to be interpreted as illustrative and not in a limiting sense.

We claim:

1. In an electrical system for supplying alternating current of substantially constant frequency and voltage to a load which may vary and wherein power is derived from a source of direct current, the combination of, a direct current motor having a main field winding and a starting winding positioned in the same magnetic axis, an alternator mechanically connected to be driven by said motor and having its output leads connected to supply current to a load, and a compensating winding which is positioned in the same magnetic axis as said starting winding and which, after said motor has reached full speed, carries current to neutralize the effect of the current flowing in said starting winding, and means to supply current to said compensating winding responsive to the operation of said alternator.

2. In an electrical system for supplying alternating current of substantially constant frequency and voltage to a load and wherein power is derived from a direct current source, the combination of, a direct current motor having an armature connected to carry current which varies with the load, a starting winding connected in series with said armature, a compensating field winding positioned in the same magnetic axis as said starting winding and connected to carry current to oppose the magnetic flux set up by said starting winding, and means deriving power from said alternator and responsive to the operation thereof to control the current flowing through said compensating winding.

3. In an electrical system for supplying alternating current of substantially constant frequency and voltage to a load which may vary and wherein power is derived from a source of direct current, the combination of: an alternator having its output leads connected to supply power to a load; a motor mechanically connected to drive said alternator, said motor having a main field winding to provide flux for the motor mainly after the motor has reached substantially full speed, a starting winding to provide field flux for the motor during the starting period of the motor, and a compensating winding positioned in the same magnetic axis as said starting winding and connected to carry a current tending to set up a flux neutralizing armature reaction and the flux produced by said starting winding; and means responsive to the operation of said alternator to render said compensating winding effective when said motor and alternator have been started.

4. In an electrical system for supplying alternating current of substantially constant frequency and voltage to a load which may vary and wherein power is derived from a source of direct current, the combination of: an alternator having a main winding and an auxiliary winding, means to supply current to said main winding to thereby produce the main field flux for said alternator; a direct current motor having an armature, a shunt winding and a series winding positioned in the same magnetic axis; means connecting in series, said series winding, said armature, and the auxiliary winding of said alternator; means mechanically connecting said motor to drive said alternator; a compensating winding wound with said series winding of said motor and positioned in the same magnetic axis therewith; and means responsive to the operation of said alternator to cause current to flow through said compensating winding in a direction and of a value to neutralize the flux-producing effect of said series winding and to neutralize other effects such as armature reaction, whereby the total field flux of said motor is decreased with increases in load.

5. In an electrical system for supplying alternating current of substantially constant frequency and voltage to a load which may vary and wherein power is derived from a source of direct current, the combination of: an alternator to supply alternating current to a load; a direct current motor mechanically connected to operate said alternator, said motor including, a starting winding which tends to set up magnetic flux during operation varying with the load of said alternator, and a compensating winding positioned in the same magnetic axis and connected to carry current to oppose the normal field flux of said motor; and means controlling the flow of current through said compensating winding and responsive to the operation of said alternator to prevent the flow of current through said compensating winding when said alternator is being started, and to then vary the current flowing through said compensating winding in accordance with the load upon said alternator.

6. In an electrical system for supplying alternating current of substantially constant frequency and voltage to a load which may vary and wherein power is derived from a source of direct current, the combination of: an alternator to supply alternating current to a load; a direct current motor mechanically connected to operate said alternator, said motor including, a starting winding which tends to set up magnetic flux during operation varying with the load of said alternator, and a compensating winding positioned in the same magnetic axis and connected to carry current to oppose the normal field flux of said motor; and control means to control the flow of current through said compensating winding comprising, a solenoid unit, a switch unit which is operated upon the energization of said solenoid to thereby cause the current from said starting winding to flow through said compensating winding, and means connecting said solenoid across the output leads of said alternator so that said solenoid is energized when said alternator has attained its full speed.

7. In an electrical system for supplying alternating current of substantially constant frequency and voltage to a load which may vary and wherein power is derived from a source of direct current, the combination of: an alternator to supply alternating current to a load; a direct current motor mechanically connected to operate said alternator, said motor including, a starting winding which tends to set up magnetic flux during operation varying with the load of said alternator, and a compensating winding positioned in the same magnetic axis and connected to carry current to tend to set up flux opposing that set up by said starting winding; and means to supply current to said compensating winding comprising, a transformer with its primary winding in one of the output leads of said alternator, and a rectifier unit with its input side connected across the output side of said transformer and with its output side connected to deliver current to said compensating winding.

8. In an electrical system for supplying alternating current of substantially constant frequency and voltage to a load which may vary and wherein power is derived from a source of direct current, the combination of: an alternator to supply alternating current to a load; a direct current motor mechanically connected to operate said alternator, said motor including, a starting winding which tends to set up magnetic flux during operation varying with the load of said alternator, and a compensating winding positioned in the same magnetic axis and connected to carry current to oppose the normal field flux of said motor; and means to supply current to said compensating winding comprising, a current transformer with its primary winding in one of the output leads of said alternator, and a rectifier unit with its input side connected across the output side of said current transformer and with its output side connected across said compensating winding, said current transformer having a primary winding with a plurality of sections connected to a switch means having a plurality of contacts and a blade which is adapted to be moved selectively into engagement with said contacts, whereby the ratio for said current transformer is selected which results in the proper current being delivered to said compensating winding.

9. In an electrical system for supplying alternating current of substantially constant frequency and voltage to a load which may vary and wherein power is derived from a source of direct current, the combination of: an alternator having a main winding and an auxiliary winding, means to supply current to said main winding to thereby produce the main field flux for said alternator; a direct current motor having an armature, a shunt winding and a series winding; means connecting in series, said series winding and said armature; means mechanically connecting said motor to drive said alternator; a compensating winding wound with said series winding of said motor and positioned in the same magnetic axis therewith; and means to supply current to said compensating winding and to said auxiliary winding comprising, a current transformer with its primary winding in one of the output leads of said alternator, and a rectifier unit with its input side connected across the output side of said current transformer and with its output side connected to deliver current to said compensating winding and said auxiliary winding.

10. In a railway electrical system, the combination of, a direct current motor having a main field winding which supplies the major portion of the field flux during the normal running period and having a starting winding which is positioned in the same magnetic axis as said main field winding and which is in series with the armature and which supplies the major portion of the field flux during the starting period, a neutralizing winding wound with said starting winding and positioned in the same magnetic axis therewith and adapted to carry current to buck said starting winding and to substantially neutralize the effect of said starting winding during the normal running period, an alternator mechanically connected to be driven by said motor and having a load which demands electrical power of substantially constant characteristics, and control means to regulate the supplying of current to said neutralizing winding so that substantially no current is carried by said neutralizing winding during the starting period of the motor and during normal operation the current varies substantially with the load on said alternator.

LOUIS H. VON OHLSEN.
JOHN J. KENNEDY.